(12) United States Patent
Watanabe (10) Patent No.: US 6,751,195 B1
(45) Date of Patent: Jun. 15, 2004

(54) COMMUNICATION CONTROL DEVICE FOR PROVIDING AN ABR SERVICE FUNCTION, AND ATM SWITCHING SYSTEM INCLUDING THE SAME

(75) Inventor: Yoshihiro Watanabe, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/291,222

(22) Filed: Apr. 13, 1999

(30) Foreign Application Priority Data

May 8, 1998 (JP) ............................................. 10-125750

(51) Int. Cl.[7] ......................... H04J 3/14; H04L 12/26; H04L 12/28
(52) U.S. Cl. ................. 370/236.1; 370/230; 370/230.1; 370/231; 370/235; 370/236
(58) Field of Search ....................... 370/236.1, 229–237

(56) References Cited

U.S. PATENT DOCUMENTS 5,974,033 A * 10/1999 Kamiya et al. ............. 370/323
6,005,843 A * 12/1999 Kamiya ...................... 370/231
6,377,583 B1 * 4/2002 Lyles et al. ................. 370/412
6,400,688 B1 * 6/2002 Lau et al. ................. 370/236.1

* cited by examiner

Primary Examiner—Melvin Marcelo
Assistant Examiner—Ronald Abelson
(74) Attorney, Agent, or Firm—Katten Muchin Zavis Rosenman (57) ABSTRACT

A communication control device includes an RM cell receiving unit which receives an incoming RM cell from a source terminal via a forward transmission line. A point-to-multipoint RM cell transmitting unit overwrites, when a congestion at a downstream portion of an ATM-based network is detected, a congested-condition ER value and a congestion notification data to the incoming RM cell received by the RM cell receiving unit, and transmits a point-to-multipoint RM cell, having the congested-condition ER value and the congestion notification data, to an upstream communication device via a backward transmission line, so that a state of the congestion is notified to the upstream communication device.

15 Claims, 6 Drawing Sheets

| Field | Bytes |
|---|---|
| GFC/VPI \| VPI | 1 |
| VPI \| VCI | 1 |
| VCI | 1 |
| VCI \| PT \| CLP | 1 |
| HEC | 1 |
| RM PROTOCOL ID | 1 |
| DIR \| BN \| CI \| NI \| RA \| Res \| Res \| Res | 1 |
| ER | 2 |
| CCR | 2 |
| MCR | 2 |
| QL | 4 |
| SN | 4 |
| Res | 30 |
| Res \| CRC | 1 |
| CRC | 1 |

The first six rows (through HEC) form the RM CELL HEADER; the remaining rows form the INFORMATION FIELD.

COMMUNICATION CONTROL DEVICE FOR PROVIDING AN ABR SERVICE FUNCTION, AND ATM SWITCHING SYSTEM INCLUDING THE SAME

BACKGROUND OF THE INVENTION (1) Field of the Invention

The present invention relates to a communication control which provides an ABR (available bit rate) service function to an ATM-based network, as well as an ATM (asynchronous transfer mode) switching system including the communication control device. In particular, the communication control device has a VS/VD (virtual source/virtual destination) function, and the ATM switching system includes the communication control device.

(2) Description of the Related Art

The framework and specifications of the ABR service have been provided by the ITU-T (International Telecommunication Union-Telecommunication Standardization Sector) and the ATM Forum. The ABR service is intended to provide the status of use of network resources by the transmission of RM (resource management) cells over ATM-based LAN or WAN networks, in order to minimize the intensity, spread and duration of congestion once congestion has already occurred. Hereinafter, the resource management cells used for the ABR service will be called the RM cells.

Figure 4:
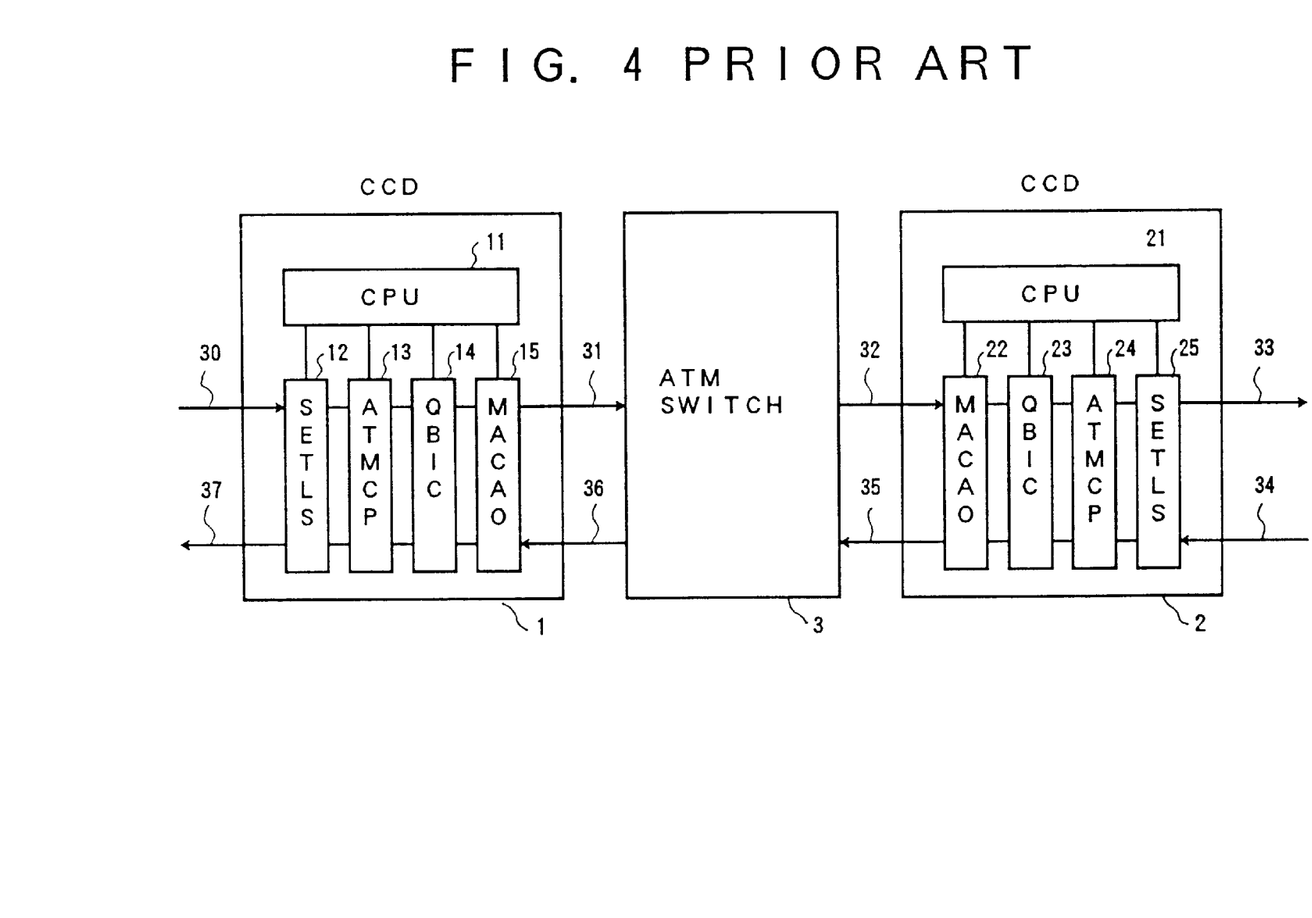
FIG. 4 is a block diagram of a conventional ATM switching system.

FIG. 4 shows a conventional ATM switching system.

As shown in FIG. 4, in the conventional ATM switching system, a communication control device (CCD) 1, a communication control device (CCD) 2 and an ATM switch 3 are provided, and these elements of the system are connected by forward transmission lines 30, 31, 32 and 33 and backward transmission lines 34, 35, and 37.

The CCD 1 includes a CPU (central processing unit) 11, an SETLS block 12, an ATMCP 13, a QBIC block 14 and an MACAO block 15. The CCD 2 includes a CPU 21, an SETLS block 25, an ATMCP 24, a QBIC block 23 and an MACAO block 22. The SETLS blocks 12 and 25 provide a physical layer interface function. The ATMCP blocks 13 and 24 provide UPC (usage parameter control), NPC (network parameter control) and OAM (operations, administration and maintenance) functions. The QBIC blocks 14 and 23 provide quality-of-service control and VD/VS functions. The MACAO blocks 15 and 22 provide the interface with the ATM switch 3. In each of the CCD 1 and the CCD 2, the SETLS block, the ATMCP block, the QBIC block and MACRO block are formed on an LSI (large-scale integration) chip.

In the conventional ATM switching system of FIG. 4, user data cells sent by a source terminal (not shown) are delivered to the CCD 1 via the transmission line 30. Further, the user data cells are passed through the CCD 1, the ATM switch 3 and the CCD 2 via the transmission lines 31 and 32 in a forward direction only, and they appear on the transmission line 33. Then, the user data cells are delivered to a destination terminal (not shown) via the transmission line 33.

Similar to the user data cells, RM cells are transmitted by the source terminal toward the destination terminal once every time a given number of user data cells have been sent. The RM cells sent by the source terminal are passed through the CCD 1, the ATM switch 3 and the CCD 2 via the transmission lines 31 and 32 in the forward direction. When each of the RM cells is delivered to the destination terminal via the transmission line 33, the RM cell is looped back to the source terminal by the destination terminal via the transmission lines 34–37 in a backward direction.

In the conventional ATM switching system of FIG. 4, the CCD 1, the ATM switch 3 and the CCD 2 are provided between the source terminal and the destination terminal. When one of the CCD 1 and the CCD 2 is placed into a congested condition, the congested device overwrites network resource information, such as a congestion indication, to each of the RM cells passed through the congested device, so that the congestion indication is notified to the source terminal by the looping back of such RM cells over the ATM network.

In an existing ABR service and an existing VS/VD function, the flow of the RM cells over the network is controlled on a path-by-path basis, including paths within the ATM switch.

For example, suppose that a transmitting buffer of the destination-end CCD 2 of FIG. 4 is at present in a congested condition. In such a case, it is desirable to minimize the intensity, spread and duration of the congestion by lowering the rate of the transmission of the cells delivered to the destination-end CCD 2. To achieve this objective, it is necessary to notify the source-end CCD 1 or the source terminal, as early as possible, that the congestion has occurred in the destination-end CCD 2.

However, the existing ABR service as provided by the conventional ATM switching system of FIG. 4 requires much time and many network resources to notify the CCD 1 or the source terminal of the occurrence of congestion at the CCD 2. After the congestion indication is written to the RM cells, the routing of such RM cells over the entire ATM network is necessary, and the notification of the congestion indication to the source terminal must be subsequent to the end of the looping back of such RM cells.

In addition, in the existing ABR service as provided by the conventional ATM switching system of FIG. 4, the flow of the RM cells over the network is controlled on a path-by-path basis. Even if the congested communication control device transmits a congestion indication directly to the source terminal by broadcasting, a speedy transmission of a large amount of information is necessary. For example, suppose that a rate of the cell transmission for every path connection is 100 cells per second, and 1000 path connections are established for a transmission line connected to the communication control device. In such a case, 100 cells per second ×1000 yields about 42 Mbps. The bandwidth available on the transmission line is narrowed, and the processing capability of the communication control device is significantly lowered.

SUMMARY OF THE INVENTION

An object of the present invention is to provide an improved communication control device in which the above-mentioned problems are eliminated.

Another object of the present invention is to provide a communication control device which provides an ABR service function to an ATM-based network, and speedily and efficiently transmits a congestion notification to a source-end communication control device or a source terminal, so as to minimize the intensity, spread and duration of congestion once congestion has already occurred.

Still another object of the present invention is to provide an ATM switching system including a communication control device which provides an ABR service function to an ATM-based network, and speedily and efficiently transmits a congestion notification to a source-end communication control device or a source terminal, so as to minimize the intensity, spread and duration of congestion once congestion has already occurred.

The above-mentioned objects of the present invention are achieved by a communication control device including: an RM cell receiving unit which receives an incoming RM cell from a source terminal via a forward transmission line; and a point-to-multipoint RM cell transmitting unit which overwrites, when a congestion at a downstream portion of an ATM-based network is detected, a congested-condition ER value and a congestion notification data to the incoming RM cell received by the RM cell receiving unit, and transmits a point-to-multipoint RM cell, having the congested-condition ER value and the congestion notification data, to an upstream communication device via a backward transmission line, so that a state of the congestion is notified to the upstream communication device.

The above-mentioned objects of the present invention are achieved by a communication control device including: a point-to-multipoint RM cell receiving unit which receives a point-to-multipoint RM cell from a backward transmission line, the point-to-multipoint RM cell having an ER value and a congestion notification data; an ER computing unit which performs an allowed cell rate ACR calculation based on the ER value output by the point-to-multipoint RM cell receiving unit, in accordance with a predetermined equation; and a shaping unit which transmits an outgoing RM cell to a destination terminal via a forward transmission line, the cell transmission of the shaping unit being controlled based on a result of the ACR calculation output by the ER computing unit, and, when a congestion at a downstream portion of an ATM-based network is detected based on the received RM cell, the shaping unit acting to lower a rate of the cell transmission according to the result of the ACR calculation.

In the communication control device of a preferred embodiment of the present invention, the point-to-multipoint RM cell transmitting unit overwrites, when a congestion at a downstream portion of an ATM-based network is detected, a congested-condition ER value and a congestion notification data to the incoming RM cell received by the RM cell receiving unit, and transmits a point-to-multipoint RM cell, having the congested-condition ER value and the congestion notification data, to an upstream communication device via a backward transmission line, so that a state of the congestion is notified to the upstream communication device. Hence, the communication control device of the preferred embodiment is effective in speedily and efficiently transmitting a congestion notification to the upstream communication device, thus minimizing the intensity, spread and duration of congestion once congestion has already occurred.

Further, in the communication control device of a preferred embodiment of the present invention, when a congestion at a downstream portion of an ATM-based network is detected based on the received RM cell at the point-to-multipoint RM cell receiving unit, the shaping unit acting to lower a rate of the cell transmission according to the result of the ACR calculation. Hence, the communication control device of the preferred embodiment is effective in minimizing the intensity, spread and duration of congestion once congestion has already occurred.

BRIEF DESCRIPTION OF THE DRAWINGS

Other objects, features and advantages of the present invention will be more apparent from the following detailed description when read in conjunction with the accompanying drawings in which.

DETAILED DESCRIPTION OF THE PREFERRED EMBODIMENT

Before describing the preferred embodiment of the present invention, in order to provide an easy understanding of the present invention, a description will be given of a flow of RM cells in an ATM-based network to which the ABR service is provided, with reference to the accompanying drawings.

Figure 1:
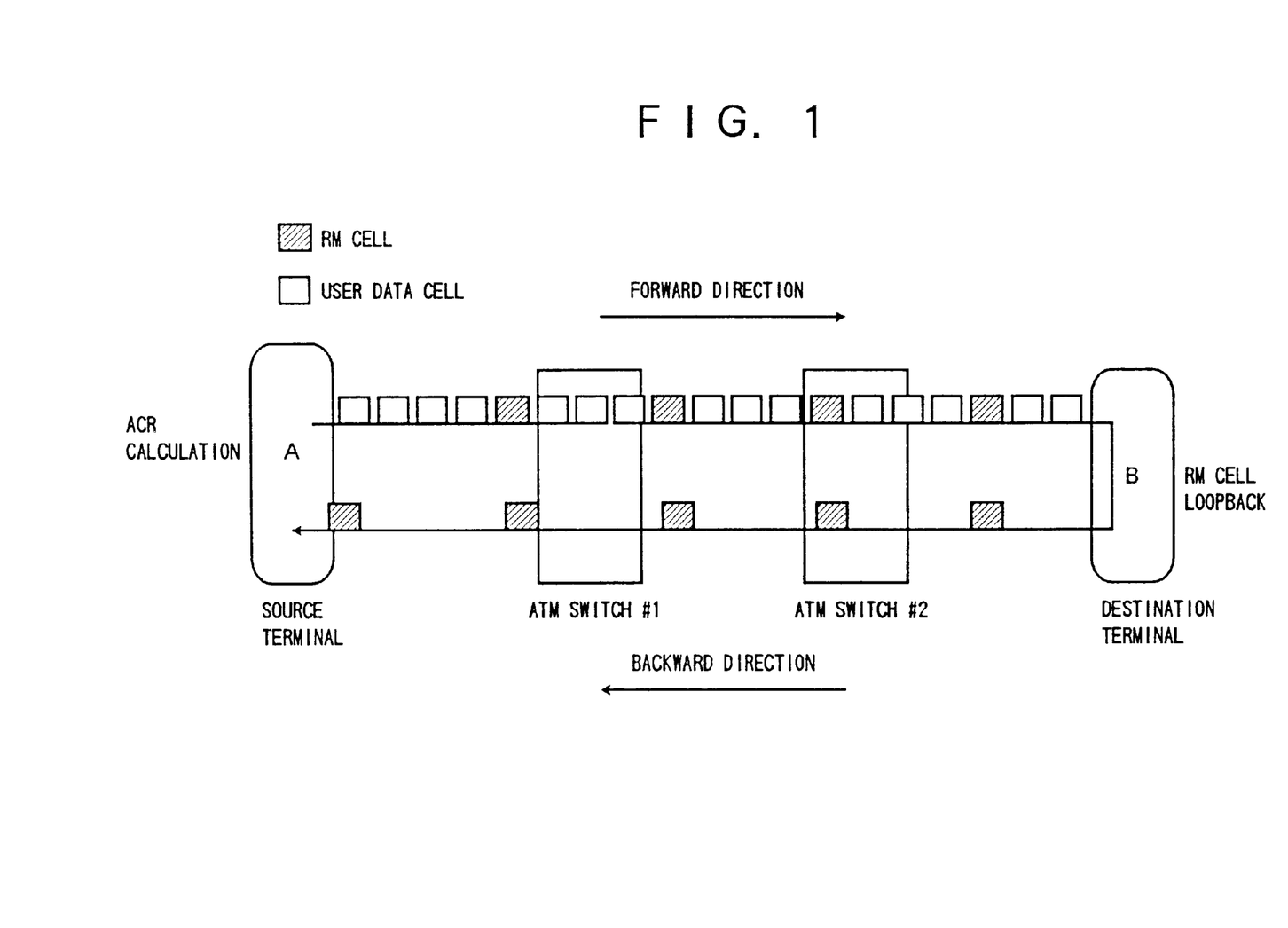
FIG. 1 is a diagram for explaining a flow of RM cells in an ATM-based network to which the ABR service is provided.

FIG. 1 shows a flow of RM cells in an ATM network to which the ABR service is provided.

As shown in FIG. 1, a source terminal A transmits RM cells in a forward direction toward a destination terminal B once every time a given number of user data cells have been sent. When each of the RM cells is transferred over the ATM network to the destination terminal B, the RM cell is sent back to the source terminal A in a backward direction by the destination terminal B.

In the ATM network shown in FIG. 1, an ATM switch#1 and an ATM switch#2 are provided between the source terminal A and the destination terminal B. For each of the RM cells transferred through the ATM switch#1 or the ATM switch#2, each of the ATM switches #1 and #2 writes network resource information, such as bandwidth data or congestion data, to the RM cell, so that the network resource information is notified to the source terminal A by the looping back of such RM cells over the ATM network.

When the RM cell to which the network resource information is written is received at the source terminal A, the source terminal A calculates an ACR (Allowed Cell Rate) of the terminal itself according to the network resource information of the received RM cell. The source terminal A performs a transmission of the cells (the user data cells and the RM cells) such that a rate of the transmission of the cells is below the renewed ACR.

Figure 2:
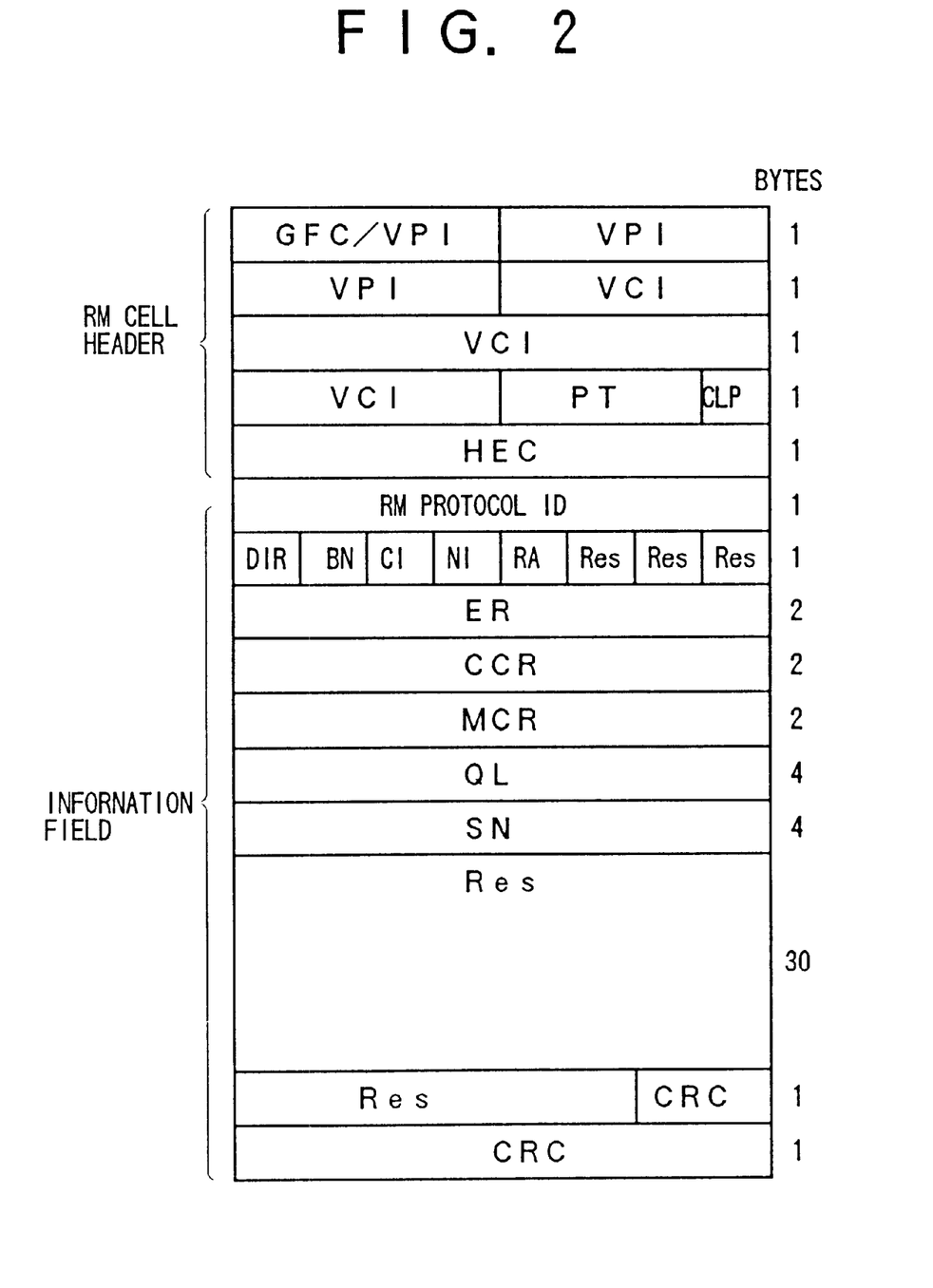
FIG. 2 is a diagram for explaining a format of an RM cell.

FIG. 2 shows a format of an RM cell.

As shown in FIG. 2, the RM cell consists of a 5-byte header and a 48-byte information field. The information field is also called the payload. This configuration of the RM cell is essentially the same as a configuration of the user data cell.

In the RM cell header format, shown in FIG. 2, the generic flow control (GFC) field does not appear in the cell header internal to the network, but only at the user-network interface. The GFC field can be used for control of cell flow only at the local user-network interface.

The virtual path identifier (VPI) constitutes a routing field for the network. The VPI is 8 bits at the user-network interface and 12 bits at the network-network interface, allowing for more virtual paths to be supported within the network. The virtual channel identifier (VCI) is used for routing to and from the end user. The VCI is 16 bits. The VCI functions much as a service access point.

The 3-bit payload type (PT) field indicates the type of information in the information field. In the case of the RM cell, the PT is set to "110". The 1-bit cell loss priority (CLP) is used to provide guidance to the network in the event of congestion. A value of 0 indicates a cell of relatively higher priority, which should not be discarded unless no other alternative is available. A value of 1 indicates that this cell is subject to discard within the network. The 8-bit header error control (HEC) field is calculated based on the remaining 32 bits of the RM cell header. The HEC is used to provide a header error detection.

In the RM cell information field format, shown in FIG. 2, the first 8-bit RM protocol identifier (RM PROTOCOL ID) indicates the identification of the RM protocol.

The direction (DIR) bit provides the indication of a direction of transmission of the RM cell in the network. A value of 0 indicates the forward direction in which the RM cell is transmitted (or the forward direction from the source terminal A to the destination terminal B as shown in FIG. 1). A value of 1 indicates the backward direction in which the RM cell is transmitted (or the backward direction from the destination terminal B to the source terminal A as shown in FIG. 1).

The backward explicit congestion notification (BN) bit provides guidance to end systems about congestion in the network. The congestion indication (CI) bit provides guidance about occurrence of a congestion in the network. The CI bit is written by the destination terminal B. The no-increase (NI) bit indicates whether there is no increase of a rate of the transmission of the RM cell. The request acknowledge (RA) bit is not used in the case of the ABR service. The reserved (RES) bits may provide additional indication for congestion control.

Further, in the RM cell information field format, shown in FIG 2, the ER bits indicate the explicit cell rate of the cell transmission. Hereinafter, a value of the explicit cell rate, included in the ER bits of the RM cell, will be called an ER value. The CCR bits indicate the current cell rate of the cell transmission. The MCR bits indicate the minimum cell rate of the cell transmission, and the minimum cell rate is determined according to a traffic contract when a connection is set up. The queue length (QL) bits are not used in the case of the ABR service. The sequence number (SN) bits indicate the sequence number. The CRC bits indicate the cyclic redundancy check bits which are used for error detection in the RM cell.

Referring back to FIG. 1, when the RM cell, to which the CI bit of the information field is written by the destination terminal B, is received at the source terminal A, the source terminal A calculates an ACR (Allowed Cell Rate) of the terminal A according to the value of the CI bit in the received RM cell. When the CI bit is set to 1 (indicating that a congestion occurs in the network), the source terminal A decrements the ACR by a given value. When the CI bit is set to 0 (indicating that no congestion occurs in the network), the source terminal A increments the ACR by a given value.

Further, the source terminal A compares the calculated ACR with the explicit cell rate of the ER bits of the received RM cell, and substitutes a smaller one of the calculated ACR and the explicit cell rate for the previous ACR of the terminal A as a new ACR thereof. However, there is a requirement that the renewed ACR of the terminal A is below the peak cell rate (PCR) and above the minimum cell rate (MCR), and it is necessary to meet also this requirement. The source terminal A performs a transmission of the cells such that a rate of the transmission of the cells is below the renewed ACR.

Further, as shown in FIG. 1, the destination terminal B terminates the user data cells transferred from the source terminal A, and sends each RM cell back to the source terminal A over the network in the backward direction. At this time, the destination terminal B detects whether the EFCI (explicit forward congestion indication) bit of the user data cell, which is received immediately prior to the RM cell at the destination terminal B, is set to 1 or 0. When the EFCI bit of the user data cell is set to 1, the destination terminal B sets the CI bit of the loopback RM cell to 1, indicating the occurrence of a congestion in the network.

Figure 3:
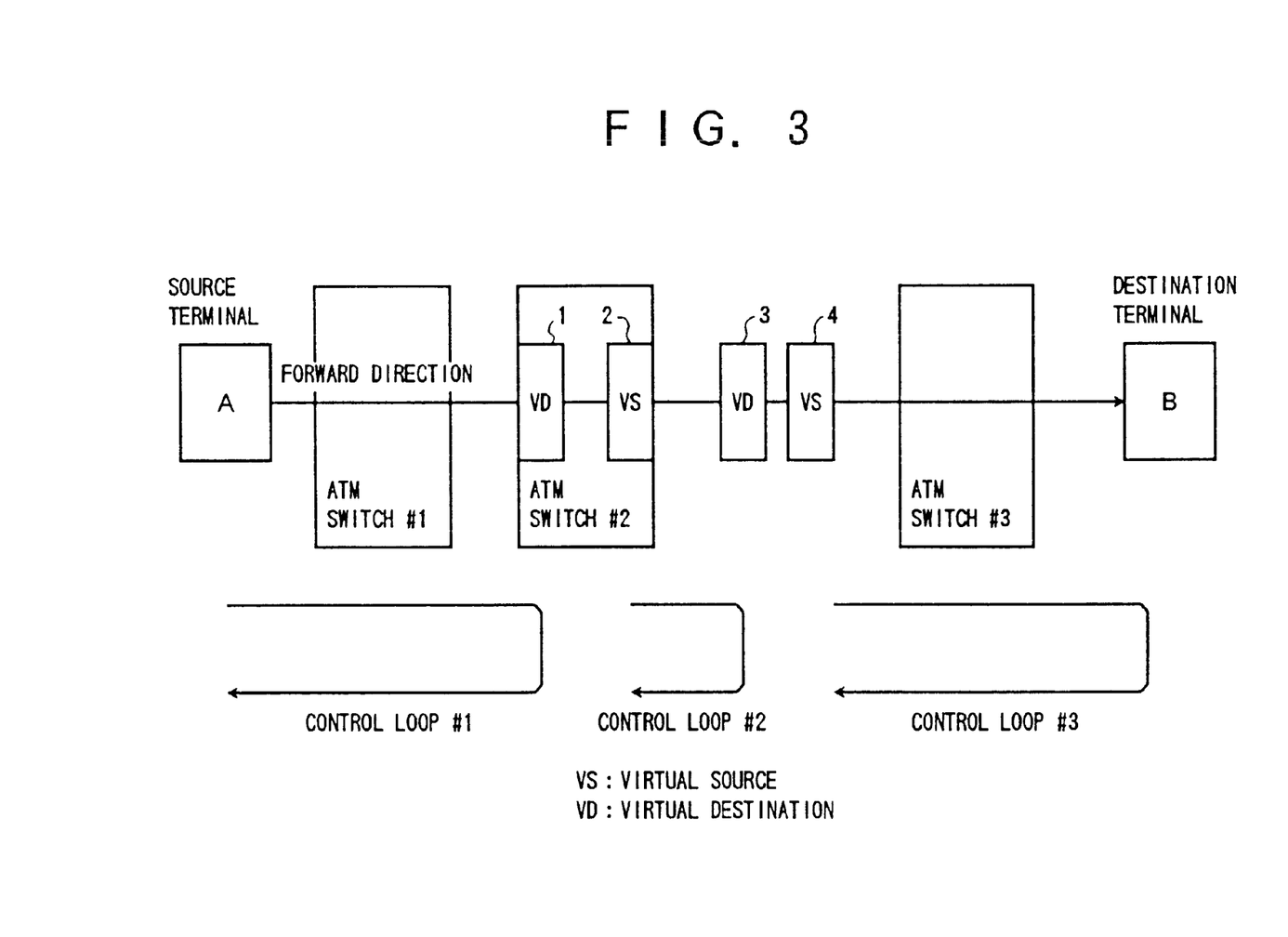
FIG. 3 is a diagram for explaining a configuration of virtual sources (VS) and virtual destinations (VD) in an ATM-based network.

Next, FIG. 3 shows a configuration of virtual sources (VS) and virtual destinations (VD) in an ATM network.

In the ATM network shown in FIG. 3, the source terminal A transmits the user data cells in the forward direction to the destination terminal B. Each of the user data cells sent by the source terminal A is transferred through an ATM switch#1, an ATM switch#2, a virtual destination (VD) 3, a virtual source (VS) 4, and an ATM: switch#3 to the destination terminal B. The ATM switch#2 includes a virtual destination (VD) 1 and a virtual source (VS) 2.

In the ATM network shown in FIG. 3, the VD 1 of the ATM switch#2 and the VD 3 are supposed to be the virtual destinations that act in the same manner as the destination terminal B. In other words, it is apparently clear that the VD1 and the VD 3 act to loop each RM cell back to the source terminal B in the backward direction when the RM cell is transferred over the ATM network to the virtual destinations. Similarly, the VS 2 of the ATM switch#2 and the VS 4 are supposed to be the virtual sources that act in the same manner as the source terminal A. In other words, it is apparently clear that the VS 2 and the VS 4 act to transmit each RM cell to the destination terminal B in the forward direction. Hence, the ATM network of FIG. 3 can be divided into three control loops: a control loop#1 constituted by the source terminal A and the VD 1, a control loop#2 constituted by the VS 2 and the VD 3, and a control loop#3 constituted by the VS 4 and the destination terminal B. Such division of the ATM network into several control loops is significantly useful when the ATM network contains a large number of network components.

Next, a description will be given of the preferred embodiment of the present invention with reference to the accompanying drawings.

Figure 5:
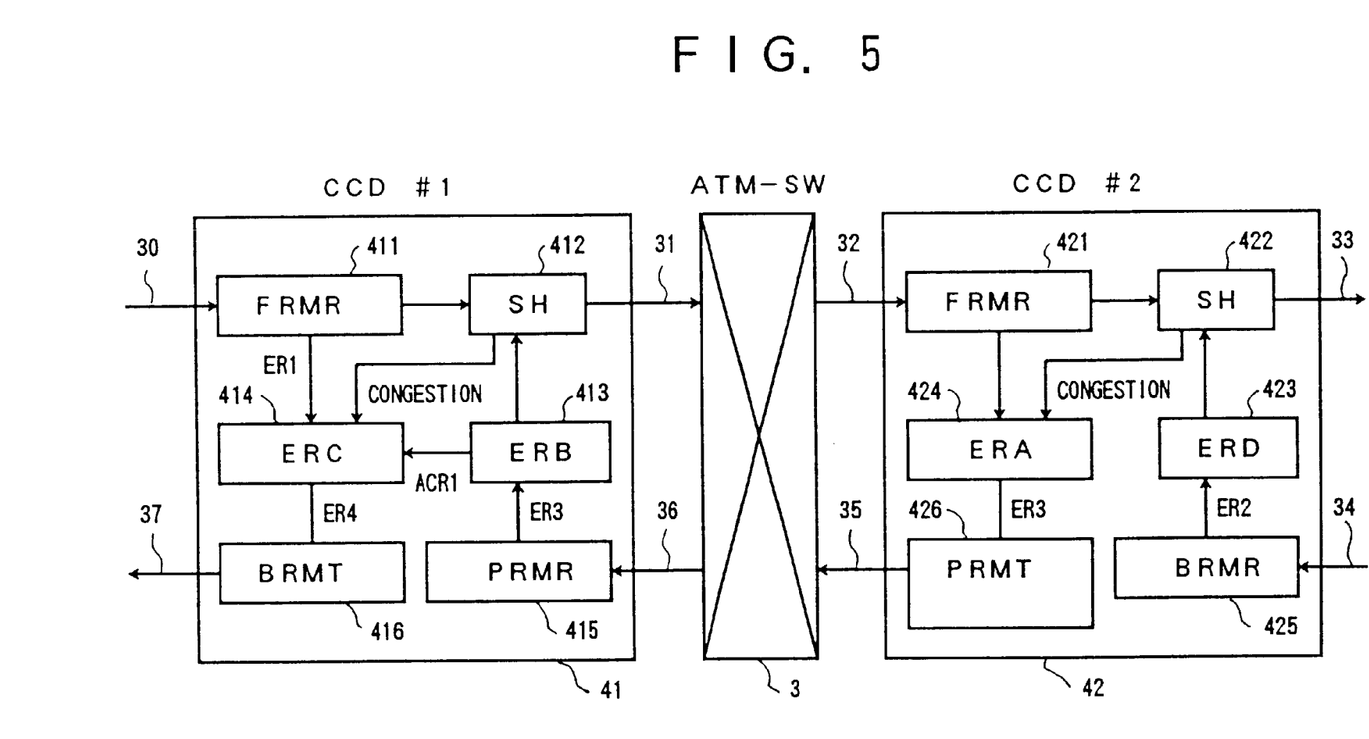
FIG. 5 is a block diagram of an ATM switching system having a communication control device embodying the present invention.

FIG. 5 shows an ATM switching system including a communication control device embodying the present invention.

In the ATM switching system, as shown in FIG. 5, a source-end communication control device 41 (CCD#1), an ATM switch 3 (ATM-SW) and a destination-end communication control device 42 (CCD#2) are provided, and these elements are connected by forward transmission lines 30, 31, 32 and 33 and backward transmission lines 34, 35, 36 and 37. The preferred embodiment of the present invention is applied to each of the communication control devices 41 and 42 shown in FIG. 5.

In the ATM switching system of FIG. 5, it is supposed that a source terminal (not shown) is provided on the source-end side of the transmission line 30 and a destination terminal (not shown) is provided on the destination-end side of the transmission line 33. Further, FIG. 5 depicts only a configuration of the communication control device of the present embodiment which processes the RM cells delivered over the ATM network. A portion of the communication control device which processes the user data cells delivered over the ATM network is not shown in FIG. 5. However, it is supposed that the user data cells sent by the source terminal are routed through the ATM switching system to the destination terminal via the transmission lines 30–33 according to a path defined when a path connection is set up.

As shown in FIG. 5, in the source-end CCD 41 of the present embodiment, a forward RM cell receiving unit (FRMR) 411, a shaping unit (SH) 412, an ER computing unit (ERB) 413, an ER computing unit (ERC) 414, a point-to-multipoint RM cell receiving unit (PRMR) 415, and a backward RM cell transmitting unit (BRMR) 416. In the destination-end CCD 42 of the present embodiment, a forward RM cell receiving unit (FRMR) 421, a shaping unit (SH) 422, an ER computing unit (ERD) 423, an ER computing unit (ERA) 424, a backward RM cell receiving unit (BRMR) 425, and a point-to-multipoint RM cell transmitting unit (PRMT) 426.

The FRMR 411 of the source-end CCD 41 receives a forward RM cell on the transmission line 30 from the source terminal, checks for compliance of the forward RM cell, and outputs the forward RM cell to the SH 412. The FRMR 411 outputs the received forward RM cell to the ERC 414. In the ERC 414, the forward RM cell is processed and converted into a backward RM cell. The SH 412 includes an FIFO (first-in first-out) data buffer, and it outputs the forward RM cells to the ATM-SW 3 via the transmission line 31 in the order in which the cells are received at the SH 412.

The SH 412 changes the explicit cell rate (ER) of the cell transmission according to a result of ER computation output by the ERB 413. Further, in the CCD 41, the, shaping unit (SH) 412 is provided for each of a number of transmission lines connected onto the ATM-SW 3.

The FRMR 421 of the destination-end CCD 42 receives a forward RM cell on the transmission line 32 from the source-end CCD 41, checks for compliance of the forward RM cell, and outputs the forward RM cell to the SH 422. The FRMR 421 outputs the received forward RM cell to the ERA!424. In the ERA 424, the forward RM cell is processed and converted into a point-to-multipoint RM cell which will be described later. The SH 422 includes an FIFO (first-in first-out) data buffer, and it outputs the forward RM cells to the destination terminal via the transmission line 33 in the order in which the cells are received at the SH 422. Further, the SH 422 changes the explicit cell rate (ER) of the cell transmission according to a result of ER calculation output by the ERD 423.

The BRMR 425 receives a backward EM cell on the transmission line 34 from the destination terminal and terminates the backward RM cell. The BRMR 425 outputs an ER value (ER2) of the received backward RM cell to the ERD 423. When the CI bit of the received backward RM cell is set to 1 (indicating that a congestion occurs in the network), the BRMR 425 outputs a congestion notification data of the received backward RM cell to the ERA 424, if the necessity arises. The ERD 423 performs the ER calculation based on the ER value (ER2), output by the BRMR 425, in conformity with the calculation method provided in the ATM Forum TM 4.0.

The PRMT 426 of the destination-end CCD 42 generates the point-to-multipoint RM cell (which will be called the PRM cell) when a congestion at a downstream portion of the ATM network is detected, and transmits the PRM cell to the transmission line 35 so as to deliver the PRM cell through the ATM-SW 3 to the source-end CCD 41. In the present embodiment, the PRM cell is generated by the PRMT 426 by processing the point-to-multipoint ER cell which is output by the ERA 424 based on the forward RM cell received at the FRMR 421. Alternatively, the PRM cell may be newly created within the CCD 42 when a congestion at a downstream portion of the ATM network is detected. In the present embodiment, the PRM cell is generated by the PRMT 426 every time the forward RM cell is received by the FRMR 421. Alternatively, the PRM cell may be generated by the PRMT 426 at predetermined periods.

When the point-to-multipoint RM cell (the PRM cell) is generated by the PRMT 426 of the CCD 42 of the present embodiment, the PT field of the PRM cell, as in the RM cell format of FIG. 2, is set to "110". Further, a routing tag is contained in the PRM cell in the present embodiment. When the congestion is detected, the routing tag of the PRM cell is set to "11111111" by the PRMT 426, and this value of the routing tag indicates that the PRM cell should be copied to RM cells directed to all destinations at the connections of the ATM switch 3 with respect to the CCD 42. Further, a given portion of the information field of the PRM cell is assigned for an cell originating device identifier field. When the congestion is detected based on a congestion notification data output from the SH 422 or from the BRMR 425, the device identifier field of the PRM cell is set to an identification number (e.g., 42) of the CCD 42, and the CI bit of the PRM cell is set to 1 by the PRMT 426. When no congestion is detected, the CI bit of the PRM cell is set to 0 by the PRMT 426.

In the ATM switch 3, the communication control device is provided for each of a number of transmission lines connected onto the ATM switch 3. Hence, the identification number of the CCD 42 accords with an identification number of the transmission line on the ATM switch 3 to which the CCD 42 is connected.

Further, when the PRM cell is generated by the PRMT 426 of the CCD 42 of the present embodiment, the ER bits of the PRM cell are set to an ER value (ER3) output by the ERA 424.

The format of the PRM cell is not limited to the above-described embodiment, and it may be arbitrarily determined if it is appropriate for the communication control device of the present embodiment to achieve the above-mentioned operations.

In the destination-end CCD 42 of the present embodiment, the ERA 424 performs different ER calculation procedures based on the received forward RM cell, which depends on whether the congestion notification data from the SH 422 indicates that a congestion is detected. The ER calculation of the ERA 424 may be varied depending on the degree of the congested condition. Alternatively, the ER value may be set to a special value (for example, the MCR) in accordance with the congested condition.

Although only the source-end CCD 41 is connected to the ATM switch 3 in the ATM switching system of FIG. 5, when the ATM switch 3 receives the PRM cell originated by the CCD 42, the ATM switch 3 delivers the PRM cell to all the source-end CCDs on the ATM switch 3 by copying the received PRM cell thereto.

The PRMR 415 of the source-end CCD 41 receives the PRM cell from the transmission line 36, and terminates the PRM cell. The PRMR 415 outputs the ER value (ER3) of the received PRM cell to the ERB 413. When the CI bit of the received PRM cell is set to 1 (indicating that a congestion occurs at a downstream portion of the network), the PRMR 415 outputs the congestion notification data of the received PRM cell to the ERC 414, if the necessity arises. The ERB 413 performs an allowed cell rate calculation based on the ER value (ER3), output by the PRMR 415, in accordance with the equation ACR1=MAX (ER3, MCR). The cell transmission of the SH 412 is controlled based on a result of the ACR calculation output by the ERB 413. When the CCD 42 is in a congested condition, the ER value (ER3) output by the ERB 413 is relatively small, and the SH 412 acts to lower the rate of the cell transmission of the CCD 41. On the other hand, when no congestion occurs in the CCD 42, the SH 412 does not act to lower the rate of the cell transmission of the CCD 41.

The ERB 413 outputs an ACR value (ACR1) as the result of the ACR calculation to the ERC 414. The SH 412 outputs a congestion notification data to the ERC 414. The ERC 414 performs an ER calculation based on the congestion notification data from the SH 412 or from the PRMR 415, in accordance with the following equations:

ER4=ER1 when no congestion is detected,

ER4=MIN (ACR1, ER1) when the CCD 42 is in a lightly-congested condition,

ER4=MCR when the CCD 42 is in a heavily-congested condition.

The ERC 414 outputs an ER value (ER4) as the result of the ER calculation to the BRMT 416. In the BRMT 416, the ER value (ER4) is overwritten to the ER bits of the RM cell: when the RM cell output by the FRMR 411 is sent back to the transmission line 37 by the BRMT 416.

In the above-described embodiment, the elements 411–416 are provided only in the source-end CCD 41 and the elements 421–426 are provided only in the destination-end CCD 42. However, according to the present invention, it is possible to provide a single communication control device (CCD) which incorporates the functions of both the elements 411–416 and the element 421–426 therein by modifying some elements so as to selectively act as the elements 414–416 and the elements 424–426 in a controlled manner.

Figure 6:
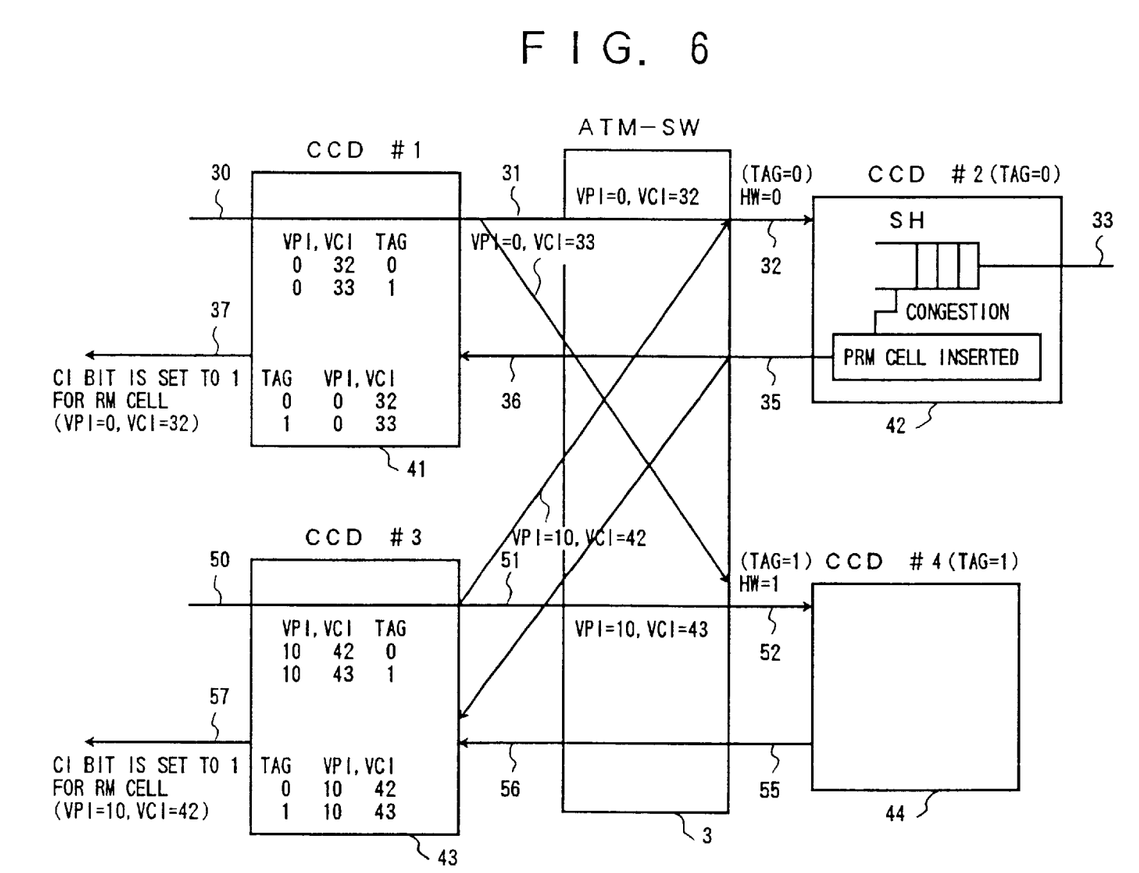
FIG. 6 is a diagram for explaining an operation of another ATM switching system having a communication control device embodying the present invention.

Next, FIG. 6 shows an operation of another ATM switching system including a communication control device embodying the present invention.

In the ATM switching system, as shown in FIG. 6, source-end communication control devices 41 and 43 (CCD#1 and CCD#3), an ATM switch 3 (ATM-SW) and destination-end communication control devices 42 and 44 (CCD#2 and CCD#4) are provided. The CCD 41, the ATM switch 3 and the CCD 42 are connected by forward transmission lines 30, 31, 32 and 33 and backward transmission lines 35, 36 and 37. The CCD 43, the ATM switch 3 and the CCD 44 are connected by forward transmission lines 50, 51 and 52 and backward transmission lines 55, 56 and 57. The preferred embodiment of the present invention is applied to each of the communication control devices 41, 42, 43 and 44 shown in FIG. 6.

In FIG. 6, the elements which are essentially the same as corresponding elements in FIG. 5 are designated by the same reference numerals, and a description thereof will be omitted.

Similar to the embodiment of FIG. 5, in the ATM switching system of FIG. 6, it is supposed that a source terminal (not shown) is provided on the source-end side of the transmission line 30 and a destination terminal (not shown) is provided on the destination-end side of the transmission line 33. Further, FIG. 6 depicts only a configuration of the communication control device of the present embodiment which processes the RM cells delivered over the ATM network. A portion of the communication control device which processes the user data cells delivered over the ATM network is not shown in FIG. 6. However, it is supposed that the user data cells sent by the source terminal are routed through the ATM switching system to the destination terminal according to a path defined when a path connection is set up.

A description will now be given of an operation of the ATM switching system of the present embodiment with reference to FIG. 5 and FIG. 6.

When a path connection is established, the CCD 41 generates both a conversion table which correlates designated VPI and VCI of an incoming user data cell with a tag of the user data cell and an inverse conversion table which correlates the tag with the designated VPI and VCI in the inverse manner. Both the conversion table and the inverse conversion table are stored in a memory (not shown) of the CCD 41. The CCD 41 reads out the tag from the conversion table when the designated VPI and VCI are given. Conversely, the CCD 41 reads out the designated VPI and VCI from the inverse conversion table when the tag is given.

The tag in the conversion table or the inverse conversion table, generated by the CCD 41, defines a destination resource of the path connection in the network. In the example of FIG. 6, a value of 0 of the tag indicates that the destination resource is the transmission line 32 (HW=0) or the CCD 42, and a value of 1 indicates that the destination resource is the transmission line 52 (HW=1) or the CCD 44.

As shown in FIG. 6, the user data cell with the VPI=0 and the VCI=32, appearing on the transmission line 30, is delivered through the ATM switch 3 to the transmission line 32 (HW=0) or the CCD 42, and the user data cell with the VPI=0 and the VCI=33, appearing on the transmission line 30, is delivered through the ATM switch 3 to the transmission line 52 (HW=1) or the CCD 44. Similarly, the user data cell with the VPI=10 and the VCI=42, appearing on the transmission line 50, is delivered through the ATM switch 3 to the transmission line 32 (HW=0) or the CCD 42, and the user data cell with the VPI=10 and the VCI=43, appearing on the transmission line 50, is delivered through the ATM switch 3 to the transmission line 52 (HW=1) or the CCD 44.

In the following, suppose that a congestion occurs at the shaping unit (SH) 422 of the destination-end CCD 42 shown in FIG. 6.

I. Cell Flow Control of Destination-End CCD By Using ER Value

When a congestion occurs at the SH 422 of the CCD 42 occurs, the PRMT 426 of the CCD 42 overwrites a congested-condition ER value and a congestion notification data to the incoming RM cell, and transmits a point-to-multipoint RM cell (or a PRM cell), having the congested-condition ER value and the congestion notification data, to the CCD 41 via the backward transmission line 35. The congested-condition ER value is larger than the MCR value calculated by the ERA 424 and smaller than the CCR value of the CCR bits of the incoming RM cell received at the FRMR 412. The congestion notification data contains the identification of the source-end CCD or the identification of the source-end transmission line.

The PRM cell from the PRMT 426 of the CCD 42 is delivered through the transmission line 35 to the ATM switch 3. The routing tag of the PRM cell is set to "11111111" by the PRMT 426, and it indicates that the PRM cell should be copied to RM cells directed to all destinations at the connections of the ATM switch 3 with respect to the CCD 42. Hence, the ATM switch 3 delivers the copied PRM cells to the CCD 41 via the transmission line 36 and to the CCD 43 via the transmission line 56.

In each of the CCD 41 and the CCD 43, the conversion table (correlating the VPI and VCI with the tag) and the inverse conversion table (correlating the tag with the VPI and VCI) are generated based on the designated data of the incoming PRM cell delivered from the ATM switch 3, and stored in the memory of the communication control device CCD. In addition, the congested-condition ER value in the ER field of the incoming PRM cell is also stored in the memory of the CCD.

When the CCD 41 is in the above-described condition, an RM cell sent by the source terminal is delivered through the transmission line 30 to the FRMR 411 of the CCD 41. In the CCD 41, the BRMT 416 acts to loop back the incoming RM cell to the source terminal via the transmission line 37. At this time, the BRMT 416 determines whether the ER4 as the result of the ER calculation by the ERC 414 is smaller than the congested-condition ER value stored in the memory of the CCD 41. When the ER4 is smaller than the congested-condition ER value, the BRMT 416 overwrites the ER4 to the ER field of the loopback RM cell, and transmits the loopback RM cell to the source terminal via the transmission line 37. In the source terminal, the rate of the cell transmission is determined (lowered or maintained) based on the ER value in the ER field of the loopback RM cell delivered from the CCD 41.

In the above-described embodiment, in each of the source-end CCD 41 and the source-end CCD 43, the explicit cell rate ER of the cell transmission is determined based on the congested-condition ER value of the incoming PRM cell. Each of the CCDs 41 and 43 can speedily and efficiently transmit or loop back the incoming ER cell with the controlled ER value to the source terminal without delay. The routing of the RM cell over the entire ATM network as in the conventional ATM switching system is unnecessary for the communication control device of the present embodiment.

Further, in the above-described embodiment, in each of the source-end CCD 41 and the source-end CCD 43, the conversion table (correlating the VPI and VCI with the tag) and the inverse conversion table (correlating the tag with the VPI and VCI) are generated based on the designated data of the incoming PRM cell. The ER value determined based on the congested-condition ER value of the incoming PRM cell can be speedily and efficiently delivered to all the destinations at the connections of the ATM switch 3. Hence, when a congestion at a downward portion of the network is detected, the source terminal or the source-end CCD can speedily lower the rate of the cell transmission according to the ER value in the ER field of the loopback RM cell, thus minimizing the intensity, spread and duration of congestion once congestion has already occurred.

II. Congestion Notification of Destination-End CCD By Using Congestion Notification Data As described above, when a congestion occurs at the SH 422 of the CCD 42 occurs, the PRMT 426 of the CCD 42 overwrites the congestion notification data (and the congested-condition ER value) to the incoming RM cell, and transmits the PRM cell, having the congestion notification data (and the congested-condition ER value), to the CCD 41 via the backward transmission line 35. The congestion notification data contains the identification of the source-end CCD or the identification of the source-end transmission line.

The PRM cell from the PRMT 426 of the CCD 42 is delivered through the transmission line 35 to the ATM switch 3. The routing tag of the PRM cell is set to "11111111" by the PRMT 426, and it indicates that the PRM cell should be copied to RM cells directed to all destinations at the connections of the ATM switch 3 with respect to the CCD 42. Hence, the ATM switch 3 delivers the copied PRM cells to the CCD 41 via the transmission line 36 and to the CCD 43 via the transmission line 56.

In each of the CCD 41 and the CCD 43, the destination of the incoming RM cell at the FRMR 411 is confirmed by making reference to the congestion notification data of the incoming PRM cell from the ATM switch 3, and the SH 41.2 acts to lower the rate of the cell transmission according to the result of the ACR calculation by the ERB 413. In addition, the conversion table (correlating the VPI and VCI with the tag) and the inverse conversion table (correlating the tag with the VPI and VCI) are generated based on the designated data of the incoming PRM cell delivered from the ATM switch 3, and stored in the memory of the communication control device CCD. Further, the congested-condition ER value in the ER field of the incoming PRM cell is also stored in the memory of the CCD.

When the CCD 41 is in the above-described condition, an RM cell sent by the source terminal is delivered through the transmission line 30 to the FRMR 411 of the CCD.41. In the CCD 41, the BRMT 416 acts to loop back the incoming RM cell to the source terminal via the transmission line 37. At this time, the BRMT 416 sets the congestion indication CI bit of the loopback RM cell to 1 (indicating that a congestion occurs in the network), and transmits the loopback RM cell to the source terminal via the transmission line 37. In the source terminal, the current cell rate CCR of the cell transmission is lowered based on the value of the CI bit of the loopback RM cell delivered from the CCD 41.

In the above-described embodiment, each of the source-end CCD 41 and the source-end CCD 43 can speedily and efficiently transmit or loop back the incoming ER cell with the congestion notification value to the source terminal without delay. The routing of the RM cell over the entire ATM network as in the conventional ATM switching system is unnecessary for the communication control device of the present embodiment.

Further, in the above-described embodiment, in each of the source-end CCD 41 and the source-end CCD 43, the conversion table (correlating the VPI and VCI with the tag) and the inverse conversion table (correlating the tag with the VPI and VCI) are generated based on the designated data of the incoming PRM cell. The value of the CI bit of the loopback RM cell can be speedily and efficiently delivered to all the destinations at the connections of the ATM switch 3. Hence, when a congestion at a downward portion of the network is detected, the source terminal or the source-end CCD can speedily lower the rate of the cell transmission according to the value of the CI bit of the loopback RM cell, thus minimizing the intensity, spread and duration of congestion once congestion has already occurred.

Further, the present invention is based on Japanese priority application No.10-125,750, filed on May 8, 1998, the entire contents of which are hereby incorporated by reference.

What is claimed is:

1. A communication control device for providing an ABR service function to an ATM-based network, comprising;

an RM cell receiving unit receiving an incoming RM cell from a source terminal via a forward transmission line; and a point-to-multipoint backward RM cell transmitting unit overwriting, when a congestion at a downstream portion of the network is detected, a congested-condition ER value and a congestion notification data to the incoming RM cell received by the RM cell receiving unit, and the backward RM cell transmitting unit transmitting a point-to-multipoint backward RM cell containing the congested-condition ER value and the congestion notification data, to an upstream communication control device via a single backward transmission line, so that a state of the congestion is notified to the upstream communication control device;

wherein the point-to-multipoint backward RM cell has a routing tag, and the point-to-multipoint backward RM cell transmitting unit overwrites a predetermined value to the routing tag of the point-to-multipoint backward RM cell when the congestion is detected, the predetermined value of the routing tag indicating that the point-to-multipoint backward RM cell should be copied to all backward RM cells directed to all destinations in the network with respect to the communication control device.

2. The communication control device according to claim 1, further comprising an ER computing unit for performing an ER calculation based on the incoming RM cell received by the RM cell receiving unit, the ER calculation being varied depending on a degree of a congested condition indicated by the incoming RM cell, the ER computing unit outputting the congested-condition ER value to the point-to-multipoint backward RM cell transmitting unit.

3. The communication control device according to claim 1, wherein the point-to-multipoint backward RM cell transmitting unit overwrites the congested-condition ER value and the congestion notification data to predetermined positions of an information field of the point-to-multipoint backward RM cell.

4. The communication control device according to claim 1, wherein the point-to-multipoint backward RM cell has a congestion indication bit, and the point-to-multipoint backward RM cell transmitting unit sets the congestion indication bit of the point-to-multipoint backward RM cell to zero when no congestion is detected.

5. The communication control device according to claim 1, wherein the point-to-multipoint backward RM cell transmitting unit generates the point-to-multipoint backward RM cell by processing the incoming RM cell received from the source terminal.

6. The communication control device according to claim 1, wherein the communication control device has at least one of a virtual destination function and a virtual source function.

7. A communication control device for providing an ABR service function to an ATM-based network, comprising a point-to-multipoint backward RM cell receiving unit receiving a point-to-multipoint backward RM cell from a downstream communication control device via a single backward transmission line, the point-to-multipoint backward RM cell having a congested-condition ER value and a congestion notification data;

an ER computing unit performing an allowed cell rate ACR calculation based on the ER value output by the point-to-multipoint backward RM cell receiving unit, in accordance with a predetermined equation; and a shaping unit transmitting an outgoing RM cell to a destination terminal via a forward transmission line, the cell transmission of the shaping unit being controlled based on a result of the ACR calculation output by the ER computing unit, and, when a congestion at a downstream portion of the network is detected based on the received backward RM cell, the shaping unit acting to lower a rate of the cell transmission according to the result of the ACR calculation;

wherein the communication control device includes a memory, and, when a path connection is established, the communication control device generates both a conversion table which correlates designated VPI and VCI of an incoming user data cell with a tag of the user data cell and an inverse conversion table which correlates the tag with the designated VPI and VCI in an inverse manner, and the communication control device storing both the conversion table and the inverse conversion table into the memory.

8. The communication control device according to claim 7, further comprising an RM cell transmitting unit for setting, when an incoming RM cell from a source terminal is delivered to the communication control device during the occurrence of the congestion, both an ER value, determined based on the congested-condition ER value, and a congestion indication value To predetermined positions of the incoming PM cell, and for looping the RM cell having the determined ER value and the congestion indication value, back to the source terminal via a backward transmission line.

9. The communication control device according to claim 7, wherein the tag in each of the conversion table an the inverse conversion table, generated by the communication control device, defines a destination resource of the path connection in the network, the destination resource being indicated by one of a transmission line identifier and a communication control device identifier in the network.

10. The communication control device according to claim 7, wherein the communication control device reads out the tag from the stored conversion table when the designated VPI and VCI are given, and reads out the designated VPI and VCI from the stored inverse conversion table when the tag is given.

11. The communication control device according to claim 7, wherein the communication control device stores, when the point-to-multipoint backward RM cell from the backward transmission line is received by the point-to-multipoint backward RM cell receiving unit, the congested-condition ER value of the point-to-multipoint backward RM cell into the memory.

12. The communication control device according to claim 8, further comprising a secondary ER computing unit for performing an ER calculation based on the incoming RM cell received by the communication control device, and the secondary ER computing unit outputting an ER value as a result of the ER calculation, to the RM cell transmitting unit.

13. The communication control device according to claim 7, wherein the communication control device has at least one of a virtual destination function and a virtual source function.

14. An ATM switching system including a communication control device for providing an ABR service function to an ATM-based network, the communication control device comprising:

an RM cell receiving unit receiving an incoming RM cell from a source terminal via a forward transmission line; and a point-to-multipoint backward RM cell transmitting unit overwriting, when a congestion at a downstream portion of the ATM-based network is detected, a congestion-condition ER value and a congestion notification data to the incoming RM cell received by the RM cell receiving unit, and the point-to-multipoint backward RM cell transmitting unit transmitting a point-to-multipoint backward RM cell containing the congested-condition ER value and the congestion notification data, to an upstream communication control device via a single backward transmission line, so that a state of the congestion is notified to the upstream communication control device;

wherein the point-to-multipoint backward RM cell has a routing tag and the point-to-multipoint backward RM cell transmitting unit overwrites a predetermined value to the routing tag of the point-to-multipoint backward RM cell when the congestion is detected, the predetermined value of the routing tag indicating that the point-to-multipoint backward PM cell should be copied to all RM cells directed to all destinations in the network with respect to the communication control device.

15. An ATM switching system including a communication control device for providing an ABR service faction to an ATM-based network, the communication control device comprising:

a point-to-multipoint backward RM cell receiving unit receiving a point-to-multipoint backward RM cell from a downstream communication control device via a single backward transmission line, the point-to-multipoint backward PM cell having an ER value and a congestion notification data;

an ER computing unit performing an allowed cell rate ACR calculation based on the ER value output by the point-to-multipoint backward RM cell receiving unit, in accordance with a predetermined equation; and a shaping unit transmitting an outgoing RM cell to a destination terminal via a forward transmission line, the cell transmission of the shaping unit being controlled based on a result of the ACR calculation output by the ER computing unit, and, when a congestion at a downstream portion of die network is detected based on the received backward RM cell, the shaping unit acting to lower a rate of the cell transmission by the result of the ACR calculation;

wherein the communication control device includes a memory, and, when a path connection is established, the communication control device generates both a conversion table which correlates designated VPI and VCI of an incoming user data cell with a tag of the user data cell and an inverse conversion table which correlates the tag with the designated VPI and VCI in an inverse manner, and the communication control device storing both the conversion table and the inverse conversion table into the memory.

* * * * *